F. P. C. DAVIS AND J. AND A. G. HALL.
LOCK NUT.
APPLICATION FILED MAR. 10, 1921.
1,435,216.
Patented Nov. 14, 1922.
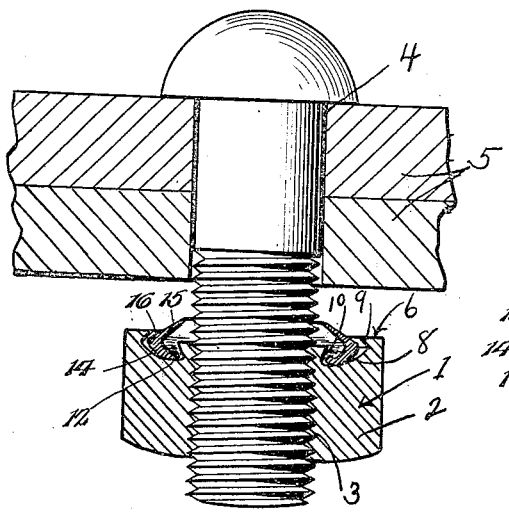
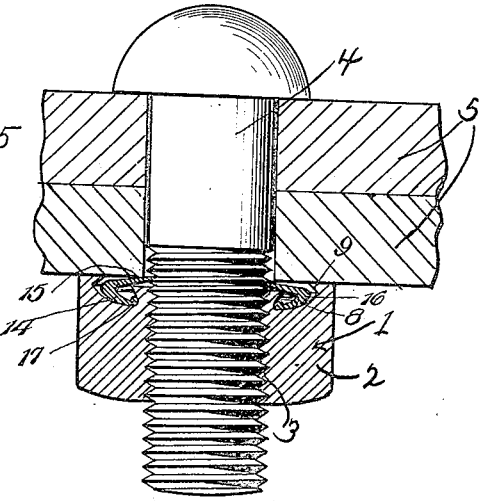
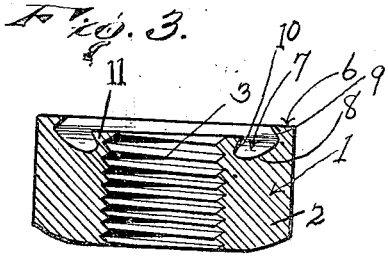
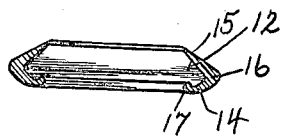
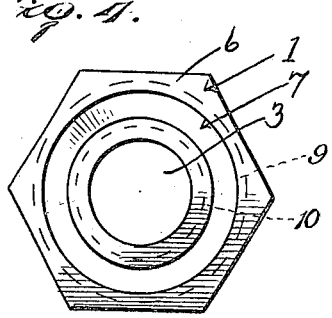
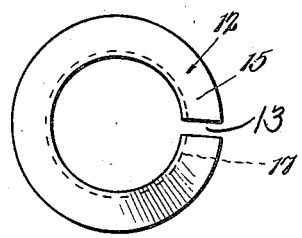
Inventors
F. P. C. Davis,
J. Hall,
A. G. Hall.
By Lacey & Lacey, Attorneys Patented Nov. 14, 1922.

1,435,216

UNITED STATES PATENT OFFICE.

FRANK P. C. DAVIS, JOHN HALL, AND ADDISON G. HALL, OF KELSO, WASHINGTON.

LOCK NUT.

Application filed March 10, 1921. Serial No. 451,089.

*To all whom it may concern:*

Be it known that we, FRANK P. C. DAVIS, JOHN HALL, and ADDISON G. HALL, citizens of the United States, residing at Kelso, in the county of Cowlitz and State of Washington, have invented certain new and useful Improvements in Lock Nuts, of which the following is a specification.

This invention relates to an improved lock nut.

One of the primary objects of the present invention is to provide a lock nut which will constitute a complete article in itself and will not require any preparation or arrangement of parts as a preliminary to its application to a bolt so that the nut may be threaded onto a bolt in precisely the same manner and with the same degree of facility as an ordinary nut, and, when tightened, will be securely locked against loosening.

Another object of the invention is to provide a lock nut which may be repeatedly employed without any of its component parts being required to be renewed and which will be as efficient in its locking action in its subsequent employment as at the time it is first used.

Another object of the invention is to provide a lock nut which when tightened will be securely locked and restrained against loosening but which may yet be removed from its bolt when occasion requires and without the employment of any tools other than the ordinary wrench and in precisely the same manner in which any ordinary nut is unthreaded from a bolt to which it is applied.

The lock nut embodying the invention comprises a nut proper and a locking member, and another object of the invention is to so construct these parts that they may be readily assembled without the employment of any extraneous means for holding them together and which will, in assembled relation, constitute a unitary structure adapted for use in the same manner as any ordinary nut.

In the accompanying drawings:

Figure 1 is a diametric sectional view through the lock nut embodying the invention applied to a bolt and partly threaded into place;

Figure 2 is a similar view illustrating the nut tightened;

Figure 3 is a diametric sectional view through the nut removed from the bolt and before the assemblage of the locking member with the nut;

Figure 4 is a plan view of the nut locking at the bearing face thereof;

Figure 5 is a diametric sectional view through the locking member removed from the nut;

Figure 6 is a plan view of the locking member.

In the drawings the lock nut embodying the invention is indicated in general by the numeral 1 and the same comprises the usual polygonal body 2 which is formed with a threaded bolt opening 3 adapting the nut for application to the ordinary bolt which is indicated by the numeral 4 and for the purpose of securing parts such for example as those indicated by the numeral 5 in the drawings. The bearing face of the nut, or in other words that face which is to bind against the parts to be secured, is indicated by the numeral 6 and this face is formed with an annular seating recess 7 which is concentric to the corresponding end of the bolt opening 3. The inner or bottom wall of the recess 7, which wall is indicated by the numeral 8, is transversely concave and sloped inwardly or in other words away from the face 6 from its outer side towards its inner side so that the seating recess 7 is of less depth at and adjacent its outer side wall than at and adjacent its inner side wall. The outer side wall of the recess is indicated by the numeral 9 and the same is inwardly beveled so that the said wall provides an annular shoulder overhanging the recess, for a purpose to be presently explained. The inner side wall of the recess is indicated by the numeral 10 and the same is likewise inwardly beveled so that it too forms an annular shoulder overhanging the recess. As stated, the recess 7 is concentric to the bolt opening 3, and the wall 10 of the recess is spaced outwardly from the wall of the bolt opening so as to provide in effect an annular bead or shoulder 11 which surrounds the inner end of the said bolt opening. The walls 9 and 10 of the recess 7 are approximately the same in depth but due to the slope of the bottom or inner wall 8 of the recess, the outer edge of the bead 11 is spaced inwardly from the plane of the bearing face 6 of the nut.

The locking member which is associated with the nut is best illustrated in Figures 5 and 6 of the drawings and is indicated in general by the numeral 12. This member comprises an annular body split, as at 13, and formed either of resilient metal or some soft or malleable metal, either as found desirable and depending respectively upon whether the lock nut is to be repeatedly used or will be required to be removed, or whether it is to remain permanently upon the bolt to which it is applied. The locking member is exteriorly of truncated bi-conical form and comprises two annular flanges 14 and 15 integrally united at the periphery of the member, as indicated by the numeral 16. The outer face of the flange 14 is inclined preferably approximately at an angle of about 40° to the plane occupied by the periphery of the locking member, and the outer face of the flange 15 is inclined at about an angle of 25° to said plane. The flanges 14 and 15 are somewhat thicker at and adjacent their juncture than at their inner or free edges, and the flange 15 is somewhat wider than the flange 14 so that the said edges of the flanges describe concentric circles, the former of which is of less diameter than the latter. Also the said edge of the flange 15, while not necessarily a knife edge, is relatively thin so that it may more readily bite into the threads of the bolt to which the nut is applied, where the locking member is of resilient metal. The inner or free edge of the flange 14 may be slightly increased in thickness or provided with a small bead 17 as for example upon its upper side, so as to provide for a firm bearing of this edge against the beveled wall 10 of the seating recess 8, as will presently be more specifically pointed out.

In its normal dimensions, the locking member 12 is of an exterior diameter slightly greater than that of the circle described by the outer edge of the wall 9 of the seating recess 7; the interior diameter of the locking member at the free edge of the flange 15 is slightly larger than the threaded portion of the shank of the bolt to which the nut is to be applied; and, the interior diameter of the member at the inner edge of the flange 14 is slightly greater than the diameter of the circle described by the outer edge of the wall 10 of the seating recess 7. In assembling the locking member with the nut, the member is slightly compressed circumferentially so as to reduce its exterior diameter sufficiently to permit of the member being disposed within the recess 7, and after introduction into the recess, the member is permitted to expand, if it is of resilient metal, or is mechanically expanded if it be of soft metal so that upon reassuming its initial form its peripheral portion will seat beneath the overhanging wall 9 of the recess 7 and the member will be retained within the recess and restrained against loss. When the member is so disposed it will assume the position shown in Figure 1 of the drawings and in this position its flange 14 will rest upon the bottom or inner wall 8 of the recess 7, and the inner edge of this flange will surround the bead or shoulder 11, confronting the beveled wall or face 10 but slightly spaced therefrom. When thus assembled with the nut, the locking member 12 will have its flange 15 projecting at its inner edge portion somewhat beyond the plane of the face 6 of the nut, and as the circle described by the edge of this flange is of greater diameter than that of the threaded portion of the shank of the bolt or of a diameter equal at least to the diameter of the bolt opening 3, the locking member will in no way interfere with the threading of the nut onto the bolt, in the usual manner. When the nut is tightened on the bolt, the projecting portion of the flange 15 will be brought into engagement with the part to be secured, and the locking member will be compressed between the part to be secured and the bottom wall 8 of the seating recess 7 so that the flanges 14 and 15 will be forced toward each other and toward the plane occupied by the periphery of the locking member. Due to the slope of the wall 8 of the seating recess, the flange 14 will be caused to ride inwardly along its wall, and its inner edge 17 will therefore be brought into firm binding engagement with the beveled surface or shoulder 10, the locking member being bodily contracted at this time. Likewise the inner or free edge of the flange 15 will be brought into biting or binding engagement with the shank of the bolt, as illustrated in Figure 2 of the drawings, and as the diameter of the circle described by it is decreased in the introduction of the locking member and in the flattening out of the said flange, this edge of the flange, if the member is of resilient metal, will be caused to bite into the shank of the bolt. If the member is of soft or malleable metal, the flange will sink into the spaces between the threads of the bolt and the effect will be substantially the same as though the nut were soldered upon the bolt. It will be evident from the foregoing that when the nut is tightened the locking member will be caused to firmly frictionally bind the bead or shoulder 11 of the nut, and at the same time will bind or grip the bolt so that the nut is securely locked against accidental loosening, although it may be removed in the ordinary manner by the exertion of the required force in the application of a wrench thereto. Where the locking member is made of resilient metal, it will resume its original form, because of its resiliency, when the nut is loosened upon the bolt after having been once tightened, and the nut may therefore be subsequently employed without the necessity of renewing the locking member. However, if the nut is to be a permanent fixture, or should it for any reason be found advisable, the locking member may be formed of soft or malleable metal in which event it will be distorted or mutilated when the nut is tightened and then should the nut ever be removed from the bolt and should it be desired to again employ the nut, it may be prepared for a second use by removing the distorted or mutilated locking member and disposing a new one within the seating recess.

Having thus described the invention, what is claimed as new is:

1. In a device of the class described, a nut having a bolt opening and a sloping surface surrounding the bolt opening, and a split circumferentially contractible locking member disposed upon said surface in position to be pressed against the same when the nut is tightened against a part to be secured, whereby the inward movement of the member upon the surface will result in circumferential contraction of the member about the bolt to which the nut is applied.

2. In a device of the class described, a nut having a bolt opening and a sloping surface located in juxtaposition to the said opening, and a circumferentially contractible locking member disposed against the surface and adapted to be caused to ride over the same in the direction of the bolt opening when the nut is tightened against a part to be secured and thereby cause the said member to have binding engagement against the bolt to which the nut is applied.

3. In a device of the class described, a nut having a bolt opening and a sloping surface surrounding the bolt opening and inclined in the direction thereof, and a split annular locking member assembled with the nut and resting upon the said surface in position to be compressed when the nut is tightened against the nut to be secured, whereby the compression of the member and its movement over the said surface will result in contraction of the member into binding engagement with the bolt to which the nut is applied.

4. In a device of the class described, a nut having a bolt opening and a sloping surface surrounding the opening and inclined in the direction thereof, and a locking member comprising a split, circumferentially contractible annular body disposed against the said surface and having a gripping portion located in juxtaposition to the bolt opening.

5. In a device of the class described, a nut having a bolt opening and a shoulder surrounding the same, and a locking member associated with the nut and surrounding the shoulder in position to be compressed when the nut is tightened against a part to be secured, the said member being contractible upon compression whereby to bind about the shoulder and to have binding engagement with the bolt to which the nut is applied.

6. In a device of the class described, a nut having a bolt opening and a shoulder surrounding the said bolt opening, the nut having a sloping face surrounding the shoulder, and a split annular locking member disposed to surround the shoulder and rest against the said surface in position to be compressed when the nut is tightened against a part to be secured, whereby upon compression of the member against the surface the said member will be contracted into binding engagement with the shoulder and into binding engagement with the bolt to which the nut is applied.

7. In a device of the class described, a nut having a bolt opening and provided in its bearing face with a seating recess surrounding the opening and providing a shoulder about the end of the opening, the inner wall of the recess sloping inwardly in the direction of the shoulder, and a locking member comprising a split annular body disposed within the recess and resting upon the said wall thereof and having a portion for binding engagement about the shoulder and a portion projecting beyond the said face of the nut for engagement with the bolt to which the nut is applied.

8. In a device of the class described, a nut having a bolt opening and provided in its bearing face with a seating recess surrounding the opening and providing a shoulder about the end of the opening, the inner wall of the recess sloping inwardly in the direction of the shoulder, and a locking member comprising a split annular body disposed within the recess and resting upon the said wall thereof and having a portion for binding engagement about the shoulder and a portion projecting beyond the said face of the nut for engagement with the bolt to which the nut is applied, the said face of the nut being provided with a shoulder overhanging the recess and retaining the member therewithin.

In testimony whereof we affix our signatures.

FRANK P. C. DAVIS. [L. S.]
JOHN HALL. [L. S.]
ADDISON G. HALL. [L. S.]